May 27, 1930.  F. F. BRAND  1,760,540
TRANSFORMER
Filed Oct. 19, 1929
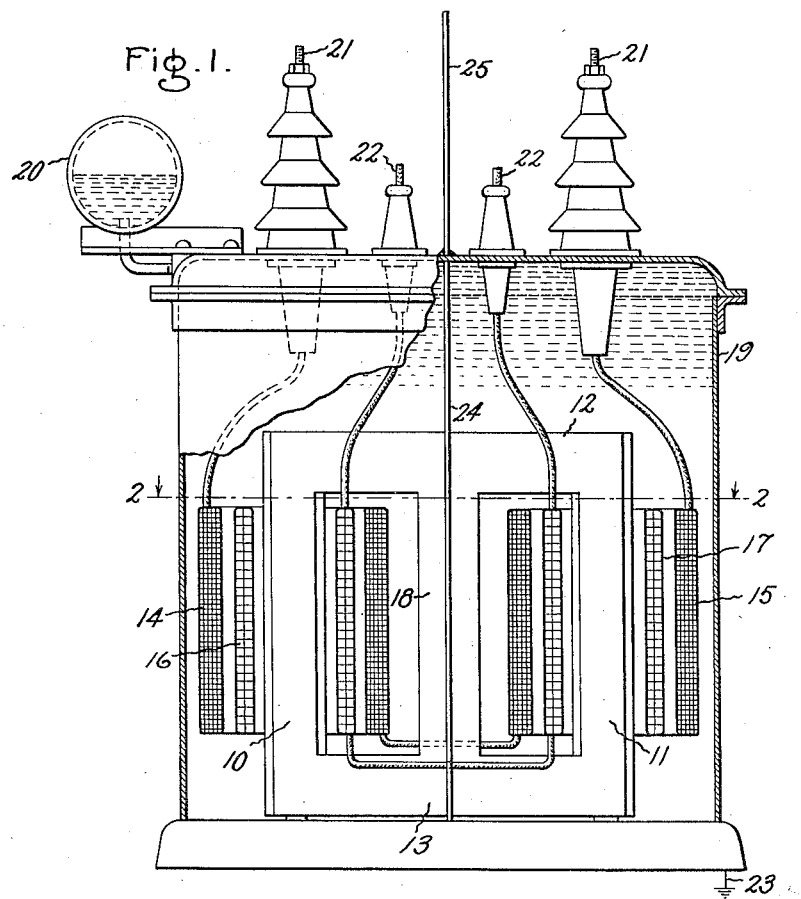
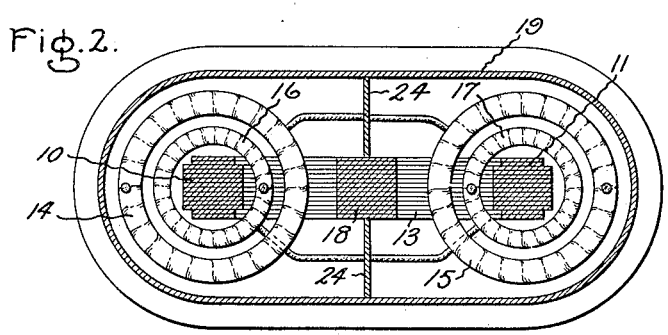
Inventor:
Frederick F. Brand,
by Charles E. Mullen
His Attorney.

Patented May 27, 1930

1,760,540

UNITED STATES PATENT OFFICE

FREDERICK F. BRAND, OF PITTSFIELD, MASSACHUSETTS, ASSIGNOR TO GENERAL ELECTRIC COMPANY, A CORPORATION OF NEW YORK

TRANSFORMER

Application filed October 19, 1929. Serial No. 400,947.

My invention relates to transformers. Large electric power generating stations generally use three-phase generating apparatus and the power is distributed over three-phase distributing systems. The capacity of some of these stations and the disastrous possibilities of short circuits between phases are so great that it has been found desirable to use what is known as the isolated phase arrangement of the buses, switches, etc., to avoid the possibility of phase to phase short circuits.

In most cases, a power transformer in a large generating station must have at least one of its windings connected for delta operation. The delta connected windings may be on a single core of a three-phase transformer enclosed in a single casing or they may be on the separate cores of three single phase transformers enclosed in separate casings, but each winding must have its two ends connected to two of the three phases outside of its casing. The general object of the invention is to provide an improved transformer construction whereby a fault in any part of the winding cannot spread to the whole winding and result in a short circuit between the phases to which the ends of the winding are connected. Although a fault may occur in any part of a given piece of apparatus, it is very unlikely that two separate faults will occur simultaneously in widely separated parts of the apparatus and if the apparatus is designed so that a fault in one part does not produce an excessive rush of current, then the result which the isolated phase arrangement was intended to produce has been accomplished.

The invention will be better understood from the following description taken in connection with the accompanying drawing in which Fig. 1 shows a single phase transformer constructed and arranged in accordance with the invention, the view being shown partly in section to reveal details of the construction, and Fig. 2 is a sectional view on the line 2—2 of Fig. 1.

Like reference characters indicate similar parts in both figures of the drawing.

The transformer shown in the drawing includes a magnetic core having two outer winding legs 10 and 11 connected by end yokes 12 and 13. A high voltage winding has two series connected sections 14 and 15 surrounding the two winding legs 10 and 11 respectively and preferably having the same or about the same number of turns. A low voltage winding also has two sctions 16 and 17 surrounding the two winding legs 10 and 11, and which may also be connected in series as shown. The yokes 12 and 13 are connected by a central core leg 18 which extends through the space between the two sections 14 and 15 of the high voltage winding.

The transformer is enclosed in an oil filled metallic casing 19, the oil extending into a conservator 20 which it partially fills. The high voltage winding is connected to high voltage terminals 21 by leads which extend through the cover of the casing 19 in insulating bushings and the low voltage winding is similarly connected to the low voltage terminals 22. The casing 19 is connected to a ground 23 and the core of the transformer is connected to the casing and is therefore also grounded.

A fault in either of the sections 14 or 15 of the high voltage winding may spread through that section and short circuit it. Any arc from such a fault, however, will almost surely not reach the other section but will go to the grounded casing or to the grounded central core leg 18 which is interposed between the two winding sections 14 and 15. There is, of course, no winding on the central core leg 18. The turns of any winding surrounding this core leg could easily permit a fault in one of the high voltage winding sections 14 and 15 to spread through them to the other high voltage winding section and result in a short circuit of the entire high voltage winding. The high voltage winding may, for example, be delta connected with two other similar windings for three phase operation and a short circuit of one of the windings would cause a sudden rush of current of such magnitude as to be dangerous to the system. In the event, however, that one of the sections 14 or 15 of the high voltage winding is short circuited, the other section of this winding will have a return magnetic path through the central core leg 18 for its flux which would be approximately twice the normal flux. The increase in magnetizing current when one section of the winding becomes short circuited will therefore not be so great as to be dangerous to the system.

In order to extend the isolated phase principle still further, a grounded metallic barrier 24 may be provided between the leads from the high voltage winding to its terminals 21. This barrier 24 may extend from the top of the transformer core to the cover of the casing 19 and across the space above the core and it may also extend downwardly, if desired, on each side of the core toward or to the bottom of the casing. A similar grounded metallic barrier 25 may also be provided above the casing 19 and between the transformer terminals 21 if these terminals are exposed. With this barrier arrangement, there is no possibility of an arc between the two high voltage terminals or between the leads connecting them to the high voltage winding but in the event of a fault at either terminal or lead any arc will go to ground. Any short circuit current to ground may be limited in value in the usual manner by suitable protective means which will quickly disconnect the transformer from the rest of the system in response to the excessive current.

The invention has been explained by illustrating and describing a particular embodiment thereof but it will be apparent that various changes may be made without departing from the scope of the invention as covered by the appended claims.

What I claim as new and desire to secure by Letters Patent of the United States is:—

1. A transformer including a grounded magnetic core, and a single phase winding on said core, said winding including two series connected sections, and said core including an unwound portion interposed between said two winding sections.

2. A transformer including a grounded magnetic core having two outer winding legs, and a single phase winding including two series connected sections respectively surrounding said two winding legs, said core also having a grounded unwound central leg interposed between said two winding sections.

3. A transformer including a grounded magnetic core having two outer winding legs, a single phase winding including two series connected sections respectively surrounding said two winding legs, said core also having a grounded unwound central leg interposed between said two winding sections, a grounded metallic casing enclosing said transformer, leads connecting said winding sections to terminals outside of said casing, and a grounded metallic barrier within said casing and between said leads.

4. A transformer including a grounded magnetic core having two outer winding legs, a single phase winding including two series connected sections respectively surrounding said two winding legs, said core also having a grounded unwound central leg interposed between said two winding sections, a grounded metallic casing enclosing said transformer, a lead extending through said casing from each of said winding sections to a terminal outside of the casing, and a grounded metallic barrier between said leads inside the casing.

5. A transformer including a grounded magnetic core having two outer winding legs, a single phase winding including two series connected sections respectively surrounding said two winding legs, said core also having a grounded unwound central leg interposed between said two winding sections, a grounded metallic casing enclosing said transformer, a lead extending through said casing from each of said winding sections to a terminal outside of the casing, a grounded metallic barrier between said leads inside the casing, and a grounded metallic barrier between said terminals.

In witness whereof, I have hereunto set my hand and seal this 17th day of October 1929.

FREDERICK F. BRAND.